United States Patent
Wang et al.

(10) Patent No.: US 8,136,641 B2
(45) Date of Patent: Mar. 20, 2012

(54) ACTUATING MECHANISM AND BRAKE ASSEMBLY

(75) Inventors: Nui Wang, Croydon (AU); Anatoly Kaganov, East Bentleigh (AU); Simon Code, East Bentleigh (AU); Anders Knudtzen, East Bentleigh (AU)

(73) Assignee: PBR Australia Pty Ltd., Victoria (AU)

( * ) Notice: Subject to any disclaimer, the term of this patent is extended or adjusted under 35 U.S.C. 154(b) by 991 days.

(21) Appl. No.: 11/629,632

(22) PCT Filed: Jun. 15, 2005

(86) PCT No.: PCT/AU2005/000854
§ 371 (c)(1),
(2), (4) Date: Oct. 15, 2007

(87) PCT Pub. No.: WO2005/124180
PCT Pub. Date: Dec. 29, 2005

(65) Prior Publication Data
US 2008/0271553 A1  Nov. 6, 2008

(30) Foreign Application Priority Data
Jun. 15, 2004 (AU) .................. 2004903250

(51) Int. Cl.
*F16D 55/08* (2006.01)
(52) U.S. Cl. ..... 188/72.8; 188/158; 188/162; 74/424.71
(58) Field of Classification Search .......... 188/72.1, 188/72.7, 72.8, 156, 157, 158, 161, 162; 74/424.71, 424.81, 424.82
See application file for complete search history.

(56) References Cited

U.S. PATENT DOCUMENTS
6,315,086 B1 * 11/2001 Schmitt et al. ............... 188/72.7
6,405,836 B1 *  6/2002 Rieth et al. .................. 188/72.1
(Continued)

FOREIGN PATENT DOCUMENTS
DE        10317104        7/2004
(Continued)

OTHER PUBLICATIONS
European Search Report for the corresponding European Patent Application No. 05750155.3-1523 dated Dec. 4, 2008.
Notice of Reasons for Rejection dated Jun. 7, 2011, corresponding to Japanese Patent Application No. 2007-515735.

*Primary Examiner* — Thomas J Williams
(74) *Attorney, Agent, or Firm* — Ohlandt, Greeley, Ruggiero & Perle, LLP

(57) ABSTRACT

An actuating mechanism, particularly for a disc brake caliper, including a screw actuator having a screw 40 and a nut 18 threadably coupled together, an electric drive for driving one of the screw 40 and the nut 18 axially relative to the other and including a stator 20 and a rotor 22, a sleeve assembly including a generally cylindrical sleeve 25 interposed between the rotor 22 and the nut 18 and supporting the rotor 22 for rotation relative to the sleeve 25. The rotor 22 is connected to one of the screw 40 or the nut 18 for rotating the screw 40 or the nut 18. The screw actuator being at least partly mounted within the sleeve 25 and being arranged to bear against a portion of the sleeve assembly to transmit axial thrust to the sleeve assembly, and the sleeve assembly cooperating with an abutment to transmit the axial thrust to the abutment.

21 Claims, 4 Drawing Sheets

U.S. PATENT DOCUMENTS

| | | | |
|---|---|---|---|
| 6,739,436 B1 | 5/2004 | Kapaan et al. | 188/72.8 |
| 6,752,249 B1 * | 6/2004 | Jungbecker et al. | 188/72.8 |
| 6,767,305 B2 * | 7/2004 | Backes et al. | 188/72.8 |
| 7,273,134 B2 * | 9/2007 | Schack et al. | 188/72.8 |
| 2003/0178264 A1 * | 9/2003 | Halasy-Wimmer et al. | 188/158 |

FOREIGN PATENT DOCUMENTS

| | | |
|---|---|---|
| WO | WO0060255 | 10/2000 |
| WO | WO2004/013513 | 2/2004 |
| WO | WO2004/057207 | 7/2004 |
| WO | WO2004/081404 | 9/2004 |

\* cited by examiner

ACTUATING MECHANISM AND BRAKE ASSEMBLY

The present invention relates to an actuating mechanism, in particular for a brake assembly, particularly a disc brake assembly. It will be convenient therefore to discuss and describe the invention in relation to that particular application, although it should be noted, that the invention could have much wider application in alternative fields to disc brakes.

The actuating mechanism of the present invention is electrically operated, and has been developed for use in brakes of both the service and/or parking kind. However, much of the development to date which utilises electric actuation has resulted in brake assemblies which are bulky and/or lengthy and which are therefore difficult to accommodate in the vehicle space historically made available for non-electric, hydraulically operated brakes. Also, the actuating mechanisms must be arranged to be operable under brake application loading, particularly during caliper housing deformation. Such deformation can result in misalignment loads being applied to the actuating mechanism which can cause jamming or wear and as such, premature failure.

U.S. Pat. No. 6,739,436 discloses an actuator for use in a disc brake caliper. That actuator employs a sleeve that supports a rotor, and a reduction gear mechanism in connection with the rotor and a ball screw. Rotation of the rotor causes the ball screw to rotate through the reduction gear mechanism. The reduction gear mechanism is disposed axially of the sleeve, thereby increasing the axial length of the caliper. Moreover, the gear mechanism is supported on an end shaft of the ball screw and on an internal wall of the caliper housing, so that the gear mechanism can shift relative to the sleeve upon deformation of the housing. Accordingly, the gear mechanism can be subject to misalignment loads transmitted through the housing that can increase wear of the gear mechanism and possibly cause failure. A further problem evident in U.S. Pat. No. 6,739,436 is that the gear mechanism is located in the same cavity as the rotor and stator, so that lubricating grease from the gear mechanism can migrate to the stator and/or rotor. This can affect the performance of both the rotor and stator, as well as the gear mechanism by loss of lubrication.

It is an object of the present invention to overcome or at least alleviate drawbacks associated with the prior art. It is a further object of the invention to provide an electric brake assembly which is effective for service brake operation and which has a compact form.

According to the invention, an actuating mechanism is provided including a screw actuator having a screw and a nut threadably coupled together, an electric drive for driving one of said screw and said nut axially relative to the other and including a stator and a rotor, a sleeve assembly including a generally cylindrical sleeve interposed between said rotor and said nut and supporting said rotor for rotation relative to said sleeve, said rotor being connected to one of said screw or said nut for rotating said screw or said nut, said screw actuator being at least partly mounted within said sleeve and being arranged to bear against a portion of said sleeve assembly to transmit axial thrust to said sleeve assembly, and said sleeve assembly cooperating with an abutment to transmit the axial thrust to said abutment.

In the above arrangement, the actuating mechanism typically will be housed within a suitable housing, such as a disc brake caliper housing, and the abutment will be formed as part of the housing. In a disc brake caliper, the abutment can be a flange or step formed within the caliper housing and typically the flange or step would be circular. The abutment could however take any other suitable form and could for example comprise any suitable structural part of a housing of a device different to a caliper, or of a frame.

In the preferred arrangement, the sleeve includes a pair of flanges for transmission of axial thrust load. A first flange extends radially outwardly for engagement with the abutment, while the second flange extends radially inwardly for engagement with the screw actuator. The axial thrust in this arrangement is transmitted from the screw actuator to the second flange and then to the first flange for transmission to the abutment. The first and second flanges can be axially spaced apart.

In one arrangement, the second flange supports one race of a thrust bearing, so that axial thrust reacted by the thrust bearing is transmitted to the second flange. In this arrangement, the other race of the thrust bearing is supported against one of the screw or nut of the screw actuator, whichever of the screw or nut that remains axially stationary during actuation. In the preferred arrangement, it is the screw that remains axially stationary, and therefore it is the nut that shifts axially and is restrained against rotational movement. Thus, in the preferred arrangement, the screw includes a seat for locating one race of the thrust bearing and preferably that seat is formed as a step or flange.

The sleeve includes radially inner and outer surfaces and it is the outer surface on which the rotor is supported. Typically the rotor will have a pair of bearings disposed at or towards opposite axial ends thereof and the outer sleeve surface is arranged to locate the bearings. In one arrangement, one of the bearings is supported by a step formed adjacent the first sleeve flange which extends radially outwardly. The second of the bearings can also be supported by a suitable step or flange, although to facilitate assembly, a circlip may be employed which is inserted when the bearings and the rotor have been positioned.

The sleeve is required to remain rotationally stationary and for this any suitable arrangement can be employed. A locating pin for example, can be extended through the sleeve and into a structural part of a housing or other structure associated with the actuating mechanism. In a caliper, such a pin can extend into the housing at any suitable position. Other suitable arrangements can also apply, and for example, the sleeve can be an interference fit in the housing or a key or splined arrangement can be made.

The connection between the rotor and the screw or nut can be achieved in any suitable manner. The invention however, provides a unique arrangement, whereby the rotor is connected to the screw or nut through a gear mechanism, typically a reduction gear mechanism.

The reduction gear mechanism facilitates a reduction in the speed of rotation between the rotor and the screw or nut. In the unique arrangement of the invention, one axial end of the rotor extends in engagement with a member, which is configured to extend about one end of the sleeve, a rear end for example, and to extend to within the sleeve, to form or support an input gear of the gear mechanism. That input gear rotates with the member, which rotates with the rotor and can form a sun gear of a planetary gear mechanism.

A stationary gear is provided on the radially inner surface of the sleeve in the region of the rear end of the sleeve. The stationary gear is grounded to the sleeve and therefore is restrained against rotation by its formation on the sleeve. The input gear and the stationary gear therefore rotate relative to each other and mesh with a plurality of planet gears disposed therebetween. Axially adjacent to the stationary gear is an output gear which also meshes with the planetary gears. The output gear is rotatable relative to the stationary gear at a reduction compared to the input gear. The output gear extends in fixed connection with the screw. In one arrangement, the output gear includes a first cylindrical portion which extends axially adjacent to the stationary gear, but which is rotatable relative to that gear and to the sleeve. Extending from the first cylindrical portion is a radially inwardly extending portion that extends to a second cylindrical portion that is fixed to the screw. Preferably the second cylindrical portion is fixed to one end of the screw, preferably the rear end thereof. The fixing may be by keyed or splined connection and when fitted to screw, a circlip may be employed to secure the second cylindrical portion from disengagement from the screw.

The gear mechanism described above can be completely disposed within the rear end of the sleeve. This advantageously facilitates a reduction in the lengthwise extent of the actuating mechanism compared to a mechanism in which the gear mechanism is disposed axially outside of the sleeve. Moreover, the gear mechanism can be isolated from the electric drive and from the rotor by its location within the sleeve, so that lubricating grease from the gear mechanism cannot migrate to contaminate the electric drive and the rotor. Instead, the lubricating grease can be constrained against migration, so that proper lubrication of the gear mechanism can be maintained. Thus, the likelihood of failure of the gear mechanism due to wear is reduced.

The above arrangement also is such as to transmit torque from the screw to the sleeve by torque transmission through the stationary gear which is grounded on the sleeve.

The invention has been discussed above in relation to its general use as an actuating mechanism and not to a specific use. The invention has however been developed for use as a disc brake actuator and therefore the following discussion relates to that specific application.

A disc brake caliper according to the invention includes a housing including a bridge section which in use, bridges a disc brake rotor, a finger section depending from a distal end of the bridge section, generally perpendicularly therefrom and arranged to support a brake pad in facing relationship with the disc brake rotor. The housing defines a cavity within which an actuating mechanism is disposed and the actuating mechanism is operable to displace a second brake pad into engagement with the opposite face of the rotor.

The actuating mechanism comprises a screw actuator including a screw and a nut, an electric drive for driving one of the screw and the nut axially relative to the other, the electric drive including a stator and a rotor and the stator being fixed to the housing, a sleeve assembly including a generally cylindrical sleeve interposed between said rotor and said nut and supporting rotor for rotation relative to said sleeve, said rotor being connected to one of said screw or said nut for rotating said screw or said nut, said screw actuator being at least partly mounted within said sleeve and being arranged to bear against a portion of said sleeve assembly to transmit axial thrust to said sleeve assembly, and said sleeve assembly cooperating with an abutment of said housing to transmit the axial thrust to said abutment.

In a preferred arrangement, the sleeve is fixed to the housing within the cavity at a single position close to the location of the second brake pad, although the position can vary along the length of the sleeve, as can the number of positions of fixing. A single position of fixing is preferred for minimising the effects of misalignment that can occur during a brake application when the housing deforms.

In the preferred arrangement, the housing defines a flange which extends radially inwardly into the cavity and the sleeve defines a radially outwardly extending flange which engages the housing flange on one side thereof. A fixing member engages the sleeve and the other side of the housing flange to fix the sleeve relative to the housing. The fixing member can be a threaded ring that threadably engages the sleeve and abuts against the flange of the housing.

In the preferred arrangement of the disc brake caliper, the nut of the screw actuator can shift axially relative to the screw, but the nut is restrained against rotation. Thus, it is the screw which is driven to rotate by the rotor, preferably through a gear mechanism. The nut can include a head with which the second brake pad is engaged and suitable sealing arrangements can be employed to seal the housing cavity from ingress of foreign matter. In one arrangement, a head which is applied to the distal end of the nut in proximity to the second brake pad, includes a seal attached about the periphery thereof and which it extends into sealed engagement with the housing.

It is to be appreciated that other features previously described in relation to the actuating mechanism can be employed in a disc brake caliper according to the invention.

A disc brake caliper according to the invention can provide various advantages including:

(a) The gear mechanism typically required for reduction purposes can be accommodated within one end of the sleeve, thereby minimising the axial extent of the caliper.

(b) The sleeve supports and/or accommodates the components of the actuating mechanism, rather than those components being supported by or on the housing. Accordingly, if the sleeve shifts under housing deformation, so do the other components of the actuating mechanism, so that the alignment of those components is not compromised. While the stator of the actuating mechanism is supported by the housing and not the sleeve, small misalignment between the stator and the rotor can be accommodated without affecting operation of the actuating mechanism. Thus, the efficiency of the actuating mechanism can be maintained throughout a caliper application.

(c) The actuating mechanism can be assembled in a module or cartridge form for insertion into the cavity of a caliper housing as a single unit. This can significantly increase the speed and ease of assembly and advantageously permits the actuating mechanism to be tested as necessary remote from the caliper, i.e. prior to assembly with the caliper so that the likelihood of failure of the actuating assembly is reduced.

For a better understanding of the invention and to show how it may be performed, embodiments thereof will now be described, by way of non-limiting example only, with reference to the accompanying drawings.

Figure 1:
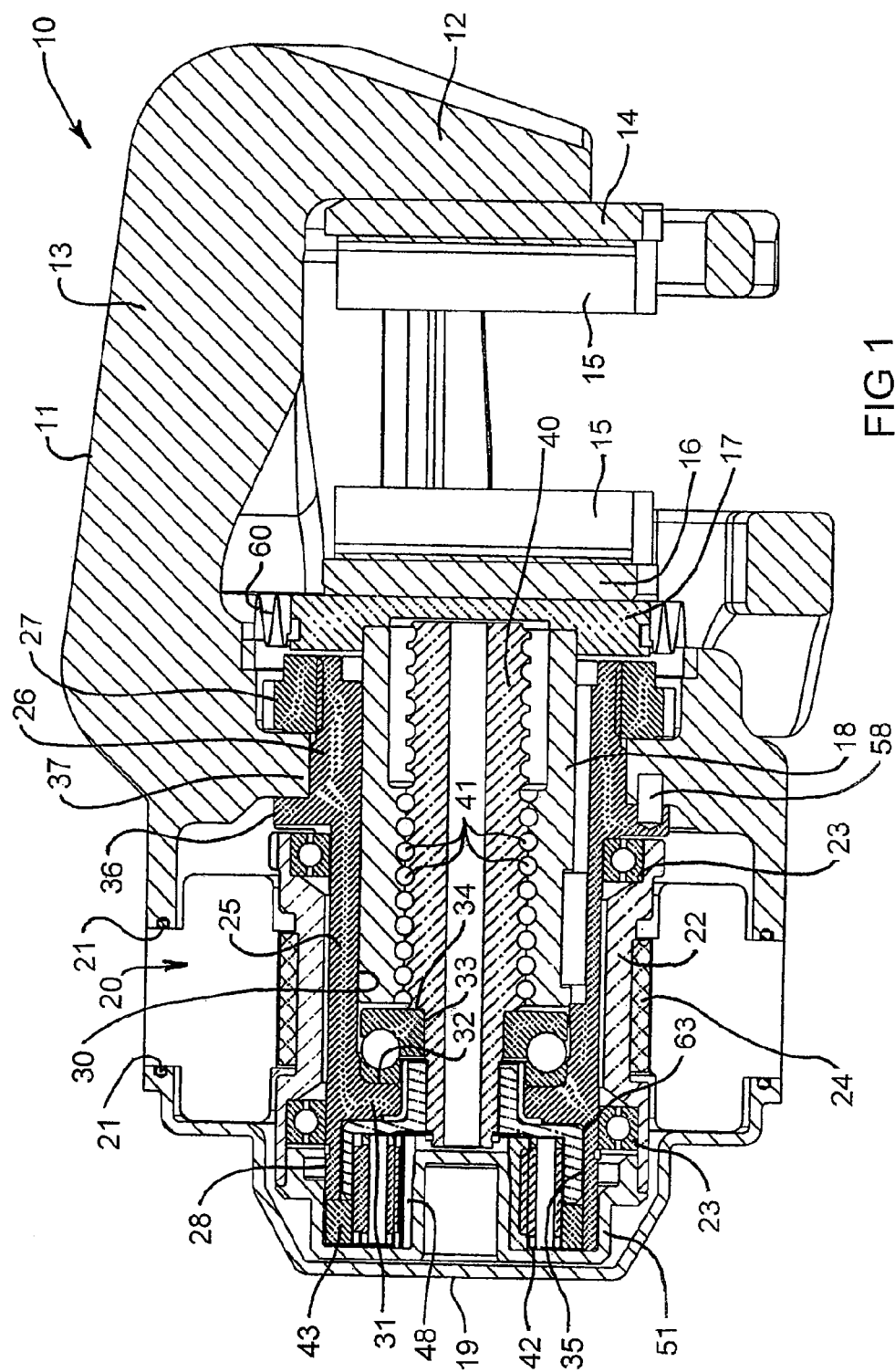
FIG. 1 is a cross-sectional view of an actuating mechanism installed in a disc brake caliper according to one embodiment of the invention.

FIG. 1 illustrates a disc brake caliper 10 which includes a housing 11 having fingers 12 which are disposed generally perpendicularly to a bridge 13 of the housing 11. The fingers 12 support a first brake pad 14 which carries a friction lining 15. A further brake pad 16 including a friction lining 15 similar to or identical to the friction lining 15 is in abutting engagement with a head 17 which is fixed to one end of a nut 18. As will become apparent later in this discussion, axial movement of the nut 18 is operable to shift the head 17 and the brake pad 16 for engagement of the friction lining 15 of the pad 16 with a rotor (not shown) disposed between the pads 14 and 16 whereafter the caliper is arranged so that the other friction lining 15 engages the opposite side of the rotor.

The housing 11 accommodates a stator 20, which is secured within the housing 11 and is sealed therewithin by O-ring seals 21. The housing 11 includes an housing cover 19 which is fixed in place by any suitable arrangement, such as by screws, when the actuating mechanism which will be described hereinafter is fitted within the housing.

A rotor 22 is disposed radially inwardly of the stator 20 and is supported on bearings 23. The rotor 22 is configured so that the bearings 23 nest within each axial end of the rotor 22, while centrally of the rotor 22, a plurality of permanent magnets 24 are fixed to the rotor by any suitable arrangement, such as by adhesive. It will be appreciated that when a current is applied to the stator 20 a magnetic flux in the stator 20, induces magneto motive force that drives the rotor 22 to rotate on the bearings 23.

The bearings 23 are supported on a sleeve 25 which extends axially about the nut 18. The sleeve 25 includes a forward end 26 which is threadably engaged with a locating nut 27, and a rearward end 28. The sleeve includes a generally cylindrical inner surface 30 which extends from the forward end 26 for a major part of the axial length of the sleeve 25, terminating in a radially inwardly extending flange 31. An axial face 32 of the flange 31 forms a supporting surface for one race of a thrust bearing 33 while the opposite race of the thrust bearing 33 engages a step 34 in the surface of the screw 40. The sleeve 25 extends toward the rearward end 28 from the flange 31 to define a further inner cylindrical surface 35.

The sleeve 25 further includes a radially outwardly extending flange 36 which is arranged to abut a radially inwardly extending section 37 of the housing 11 on one side thereof and to provide a location for the roller bearings 23 on the other side thereof. Location of the sleeve 25 is achieved by sandwiching of the section 37 of the housing 11 between the locating nut 27 and the sleeve flange 36. A pin 58 can be employed to secure the sleeve 25 against rotation relative to the housing 11.

The nut 18 cooperates with the ball screw 40 so the rotation of the screw 40 causes axial movement of the nut 18. Engagement between the nut 18 and the ball screw 40 is by way of a plurality of balls 41. The ball screw 40 is rotated upon rotation of the rotor 22 through the gear mechanism 42 located within the rearward end 28 of the sleeve 25. The gear mechanism 42 is illustrated in more detail in FIG. 2.

Figure 2:
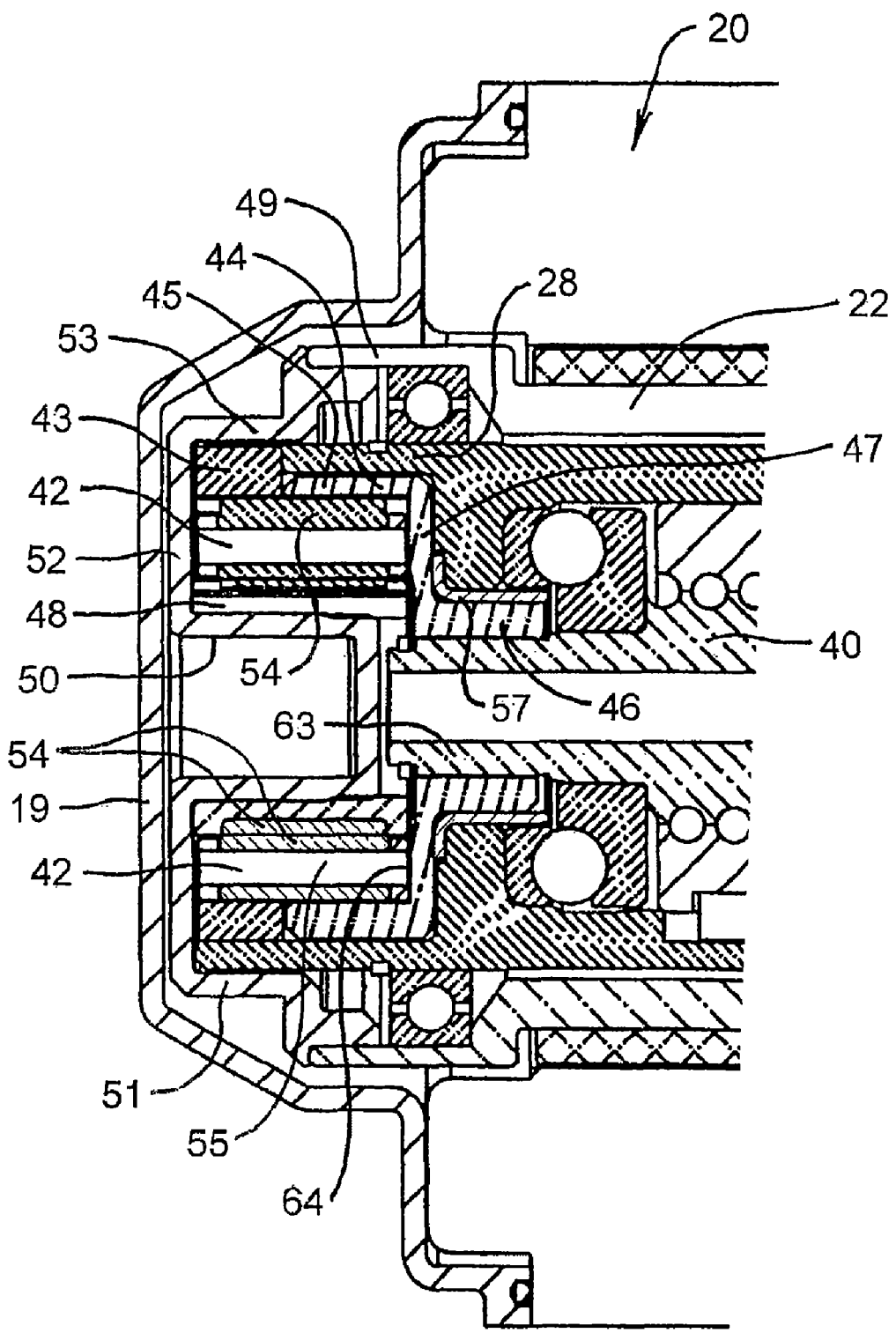
FIG. 2 is a detailed view of the gear mechanism of the actuating mechanism of FIG. 1.

With reference to FIG. 2, the gear mechanism 42 includes a stationary gear 43 which is fixed to the radially inner surface of the rearward end 28 of the sleeve 25, so that it remains stationary. Axially adjacent the stationary gear 43, is an output gear 44, which includes first and second axial segments 45 and 46 and a radial connecting segment 47. The first and second axial segments 45 and 46 and the radial connecting segment 47 are formed integrally, as an output gear 44. The output gear 44 is fixed at the second axial segment 46, to the outer surface of the ball screw 40 by any suitable arrangement, such as a splined or keyed connection. Thus, the output gear 44 is fixed relative to the ball screw 40, and therefore rotary movement applied to the output gear 44 is transferred to the ball screw 40 and causes the ball screw 40 to rotate.

The stationary gear 43 is fixed to the rearward end 28 of the sleeve 25 by any suitable manner, such as by welding, interference fit, or adhesive. In the embodiment illustrated in FIGS. 1 and 2, the rearward end 28 of the sleeve includes axially extending slots which extend from the distal end of the sleeve inwardly, and the stationary gear 43 includes tabs which extend radially into the axial slots. Effectively the tabs are projections received within the slots and by that receipt, the stationary gear 43 is captured against rotation relative to the sleeve 25. The cross-section shown in FIGS. 1 and 2 show the stationary gear 43 seemingly to have a greater thickness at the upper end of the figures, compared to the lower end. However, this is because the cross-section of these figures extends through a tab of the stationary gear 43 in the upper end thereof and not in the lower end.

The output gear 44 rotates relative to the sleeve 25 and is in geared connection with planetary gears which also extend in geared connection with the stationary gear 43. The arrangement is such that an input gear 48 in the form of a sun gear, is rotated with the rotor 22 by fixed location of the input gear 48 on an inwardly extending boss 50 of an end cover 51. The end cover 51 is fixed at radially outer ends thereof to the rear end 49 of the rotor 22. That connection can be in any suitable form, but preferably is threaded. The end cover 51 is formed for connection to the rotor 22 and to extend about the rear end of the rotor 22 and to form the boss 50. The boss 50 extends to a radial section 52 and that section extends to a connecting section 53 for connection to the rotor 22. The input gear 48 can be connected to the boss 50, such as by an interference fit, or the input gear 48 could be integrally formed with the boss 50.

Thus, on rotation of the rotor 22, the end cover 51 is rotated causing the boss 50 and the input gear 48 to rotate. Disposed between the input gear 48 and each of the stationary and output gears 43 and 44, is a plurality of planet gears 54. Two planet gears 54 and shown in FIGS. 1 and 2, although preferably six are provided. The planet gears are each disposed about an axle 56 which is fixed at either end in a carrier or cage 56. Thus, the planet gears 54 are rotatable about the axles 56. The planet gears 54 are spaced apart equidistantly about the boss 50. The planet gears 54 each mesh with the input gear 48, across substantially the full width thereof, and with each of the stationary gear 43 and the first axial section 45 of the output gear 44. This latter meshing is across adjacent portions of the width of the planet gears 54.

Rotation of the input gear 48 causes the planet gears 54 to rotate both about the axles 55 and about the boss 50. That rotation causes the first axial section 45 of the output gear 44 to rotate and so the entire output gear 44 rotates, thereby driving the screw 40 to which the second axial section 46, to rotate. This unique gear mechanism 42 can facilitate a reduction in the revolutions from the rotor 22 to the output gear 44, so that the ball screw 40 is driven at low revolutions but high torque by suitable selection of tooth numbers and profiles.

An anti-friction bush 57 is disposed between the second axial segment 46 and the radial connecting segment 47 of the output gear 44, and the radially inwardly directed flange 31 of the sleeve 25. That anti-friction bush 57 permits the output gear 44 to be supported along each of the vertical and axial faces of the distal end of the flange 31, but to be able to rotate relative to the flange 31 and to the rearward end 28 of the sleeve 25.

At the opposite end of the sleeve 25, the nut 18 includes the head 17 which bears against the rear of the brake pad 16. The head 17 can be fixed to the nut 18 in any suitable manner, and may for example be a thread fit, or a friction fit. The head 17 typically will be circular, and the periphery of the head 17 cooperates with a boot seal 60, which is also fixed to the housing 11, so that ingress of foreign matter into the cavity in which the nut 18 is accommodated, is prevented.

The caliper 10 is operable as follows. When a brake application is required, a current is applied to the stator 20 to induce rotation of the rotor 22. The rotor 22, by its connection at the rear end 49 thereof to the end cover 51, drives the input gear 48 to rotate and that rotation drives the planetary gear arrangement to drive the output gear 44 and through the connection of the output gear 44 with the ball screw 40, the ball screw 40 is driven to rotate. There is no restriction on the ball screw 40 against rotation however there is a restriction against the ball screw 40 moving axially. Axial movement is restricted by circlip engagement at the rear end 63 of the ball screw 40 and the vertical face 64 (FIG. 2) of the radial connecting segment 47 of the output gear 44. It will be appreciated, that the output gear 44 is constrained against axial movement, by the radially inwardly extending flange 31.

Thus, the nut 18 is constrained to move axially relative to the rotating screw 40 and to shift the head 17 toward the disc brake rotor. In doing this, the brake pad 16 is caused to shift the friction lining 15 into engagement with the rotor and that engagement causes the brake pad 14 to do so as well, according to the normal principles of disc brake operation. The brake application is maintained for as long as a current is supplied to the stator 20 and when brake release is required, in one embodiment, it is necessary only to reduce or remove the current supplied to the stator 20 and allow the nut 18 to backdrive relative to the ball screw 40. Backdriving will occur as the housing 11 recovers from distortion through the bridge 13, although the electric drive of the actuating mechanism can be controlled to control brake release, in particular to ensure that the set running clearance is maintained.

The arrangement of the invention provides several advantages over present electric drive arrangements for disc brake calipers. A particular advantage obtained by the invention, is through the adoption of the planetary gear mechanism 42 disposed within the sleeve 25. In other arrangements, gear mechanisms are disposed further axially away from the ball screw 40, so lengthening the caliper and thereby reducing the number of applications to which the caliper can be applied. See for example U.S. Pat. No. 6,739,346. Moreover, the arrangement shown in FIG. 1 minimises or eliminates the opportunity for migration of grease to the electric motor comprising the stator 20 and the rotor 22, from the gear mechanism 42. This is because the gear mechanism 42 is isolated from the electric motor by virtue of its containment radially within the sleeve 25.

A further and significant advantage is provided by the sleeve 25 which supports the rotor 22, the gear mechanism 42, and the nut 18 and ball screw 40. That support is distinguished from other arrangements, in which support for one of more of these components is provided through the caliper housing. In those arrangements misalignment can occur between various components during a brake application, when deformation through the bridge of the housing, often known as "yawning", occurs. In the present invention however, the effects of deformation through the housing 11 on the alignment of the various components of the actuator drive, is minimised or eliminated, because the various components are mounted or supported relative to the sleeve 25, rather than the housing 11. Accordingly, if the position of the sleeve 25 is shifted through deformation of the housing, then the sleeve will shift all of the components which are mounted relative to it. It is accepted, that a shift in the position or alignment of the sleeve 25 will shift the rotor 22 out of proper alignment with the stator 20, but that is an acceptable misalignment, given that slight misalignments of the kind envisaged will have a negligible effect on drive of the rotor 22 by the stator 20.

By maintaining alignment of the various components of the actuator drive, efficiency of the system is maintained and in particular, the possibility of a jam occurring is largely eliminated. It will be appreciated that jamming is a real possibility under sufficient misalignment conditions, given that the caliper 10 is reliant on smooth axial movement of the nut 18 on the ball screw 40.

A further advantage that can be achieved by the present invention, relates to noise insulation or damping. This is because noise generated in the gear mechanism 42 is enclosed within the sleeve 40 and the end cover 51, and is further encased by the housing cover 19 attached to the housing 11. Thus noise generated in the gear mechanism 42 can be effectively insulated and again, with reference to U.S. Pat. No. 6,739,346, the present invention provides enhanced noise insulation compared to the caliper of that reference. In particular, the end cover 51 can be manufactured from a material having high damping properties, such as plastic. If plastic is selected, then the input gear 48 can be formed integrally with the end cover 51, rather than being a separate component.

It will be appreciated from FIG. 1, as to how the actuating mechanism of the present invention can be formed as a module or cartridge for easy insertion into the housing 11. Thus, the actuating mechanism comprising the sleeve 25, and the various components attached to the sleeve 25, but excepting the stator 20, can be formed as a single assembly externally of the caliper housing 11. That assembly can be tested as required and then inserted into the housing 11 prior to attachment of the housing cover 19. The stator 20 can be fixed to the caliper housing 11 prior to insertion of the actuating assembly, or it can be inserted afterwards. This further contrasts with the arrangement of U.S. Pat. No. 6,739,346, in which the various components of the actuator cannot be formed as a single unit for insertion into the caliper housing. Rather, the components of the actuator are separately assembled within the caliper housing.

Figure 3:
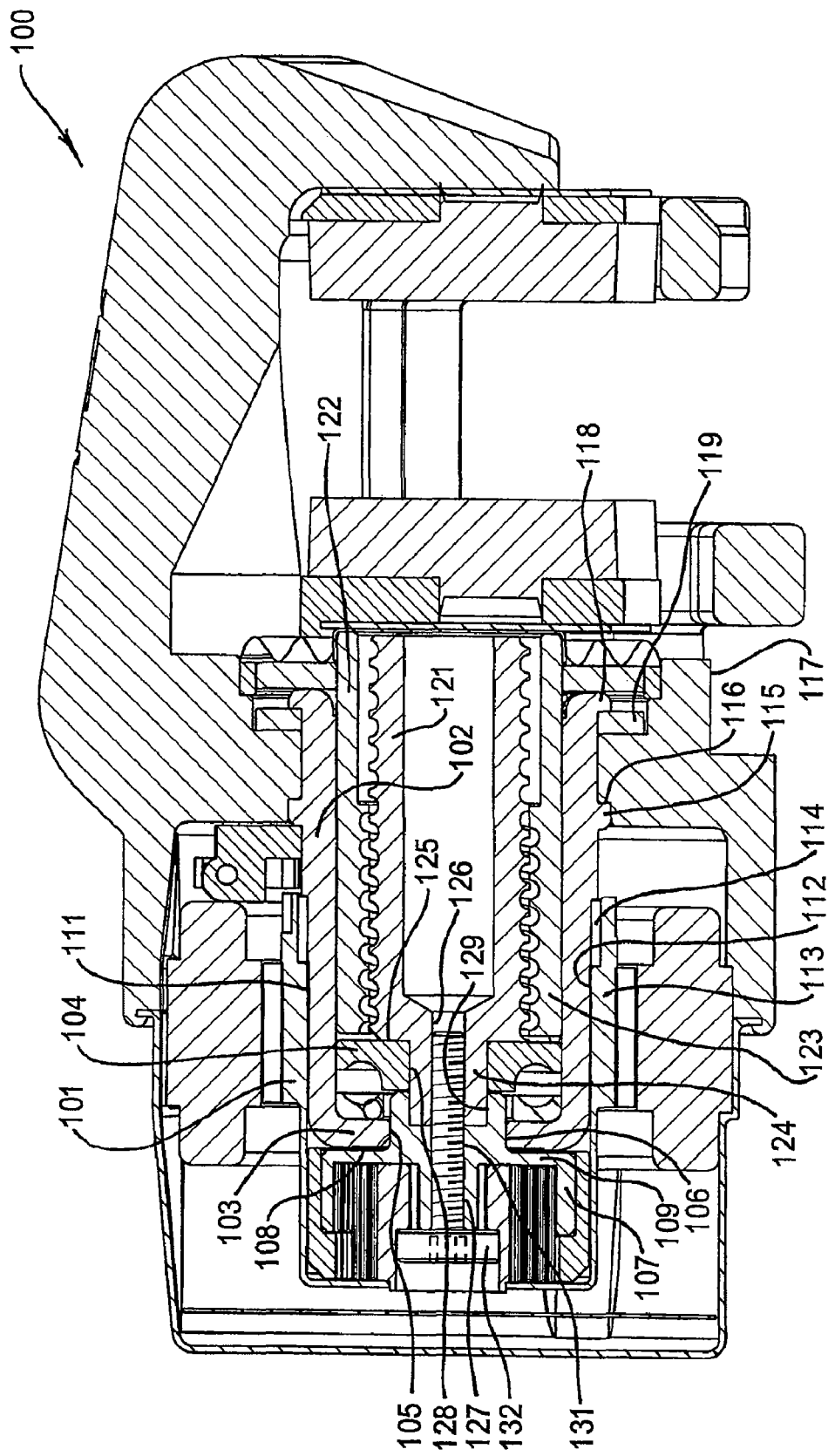
FIG. 3 is a cross-sectional view of an alternative embodiment of a disc brake caliper which includes an actuating mechanism according to the invention.
Figure 4:
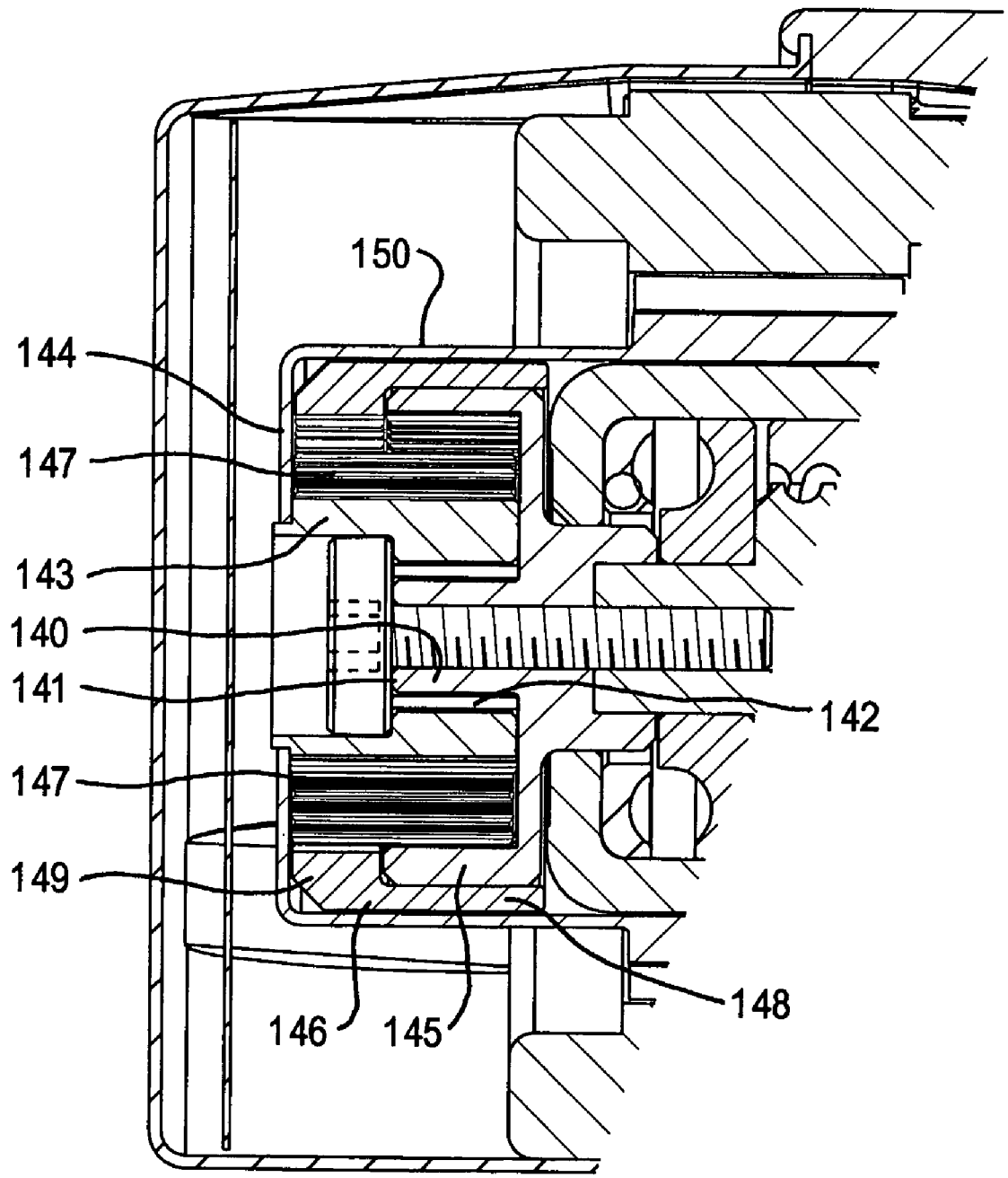
FIG. 4 is a detailed view of an end section of the caliper of FIG. 3.

An alternative arrangement is shown in FIGS. 3 and 4. With reference to FIG. 3, the disc brake caliper 100 includes a sleeve 101 which differs from the sleeve 25 of the embodiment of FIGS. 1 and 2. The sleeve 101 includes a cylindrical body 102 which extends at one end to a radially inwardly depending flange 103. The flange 103 forms a supporting surface for one race of a thrust bearing 104. The radially inner end 105 of the flange 103 extends close to but slightly spaced from the facing cylindrical surface 106 of an output gear 107. Likewise, the axially facing surface 108 of the flange 103 is in spaced, facing relationship with a radially extending arm 109 of the output gear 107. Still further, the radially outer surface 111 of the sleeve body 102 is in spaced, facing relationship with a cylindrical surface 112 of a rotor 113. Thus, each of the output gear 107 and the rotor 113 are spaced from connection with the sleeve 101 so that the output gear 107 and the rotor 113 can rotate relative to the sleeve 101. A needle bearing 114 is disposed between the sleeve 101 and the rotor 113 to permit relative rotation and to support one end of the rotor 113 relative to the sleeve 101. Each of the sleeve 101 and the rotor 113 include a seat for locating the needle bearing 114.

The sleeve 101 includes a first radially extending flange 115, that extends into a recess 116 formed in a section of the housing 117 of the caliper 100. The flange 115 can be an annular ring, or it can be formed in one or more separate arcuate sections. The remaining portion of the housing 117 can be assumed to be generally the same as the housing 11 of FIG. 1.

The flange 115 locates the sleeve 101 in one axial direction, while a second radially extending flange 118 locates the sleeve 101 in an opposite direction. In the arrangement illustrated, the flange 118 is formed by a metal deformation process, such as swaging or orbital riveting and disposed between the flange 118 and the housing 117 is a washer 119. The washer is provided to protect the housing material from being deformed during the swaging or orbital riveting process. By swaging or orbital riveting the flange 118, the sleeve 101 is securely and non-releasably fixed to the housing 117. An alternative arrangement could comprise a threaded ring that is threaded onto the end of the sleeve 101.

In the arrangement illustrated in FIG. 3, a ball screw comprising a screw 121 and a nut 122 is provided. The ball screw 121, 122 has the same operation as the ball screw 40 of FIG. 1, so that in the FIG. 3 arrangement, the screw 121 is rotatable and is restrained against axial movement and the nut 122 is axially movable and is restrained against rotation. For this, the nut 122 can be in splined or keyed connection with the sleeve body 102.

The screw 121 has a threaded body 123 and an axial boss 124. A step 125 exists between the body 123 and the boss 124 and that step 125 forms a supporting surface for the facing race of the thrust bearing 104.

The boss 124 includes a threaded bore 126 which receives the threaded shaft of a fastener 127. The boss 124 also cooperates with the output gear 107 so that rotation of the output gear 107 results in rotation of the screw 121. The cooperation between the output gear 107 and the boss 124 can be by any suitable arrangement and in the arrangement illustrated, the outer surface 128 of the boss 124 can be formed with flat sections, to be received within a recess 129 of the output gear 113 which has a complementarily shaped internal surface. Other arrangements to secure the output gear 107 to the boss 124 can alternatively be employed. Thus, the output gear 107 and the screw 121 are rotatably fixed together.

The output gear 107 forms one part of a gear mechanism which will be described in relation to FIG. 4. The output gear 107 is formed for connection to the boss 124 of the screw 121 as described above. The output gear 107 further includes a cylindrical section 140 that extends about the shaft 131 of the fastener 127. The cylindrical section 140 is a clearance fit about the shaft 131. The end 141 of the cylindrical section 140 is in abutting engagement with a facing surface of the head 132 and by this arrangement, the head 132 applies a load to the output gear to maintain the output gear 107 connected with the boss 124. The radially outer surface 142 of the cylindrical section 140 supports a bearing (not shown) between it and a sun or input gear 143. The bearing can be a needle bearing. The input gear 143 is formed with a step to enable it to mesh with the cylindrical section 140 and to extend about the head 132 of the fastener 127. The input gear 143 extends axially to a position at which it engages a radially inwardly extending end portion 144 of the rotor 113. Thus, the input gear 143 is rotatable with the rotor 113. The engagement of the end portion 144 with the input gear 143 can be by welding or interference fit, or by any other suitable connection and firstly provides a second point of support for the rotor 113 in addition to the support provided by needle bearing 114 and secondly is operable to cause the input gear 143 to rotate with the rotor 113.

The output gear 107 forms or supports gear teeth on a radially inner surface of a cylindrical section 145 that extends from the arm 109 thereof. The cylindrical section 145 is in facing relationship with a first portion 148 of a stationary gear 146 that is fixed against rotation by connection to the sleeve 101. The fixing arrangement is not illustrated in FIG. 4, but comprises fingers or prongs which extend from the stationary gear 146 into torsional engagement with openings or recesses in the sleeve 101. The cylindrical section 145 can be in rotational sliding engagement with the first portion 148, or they can be in spaced, facing relationship. Where the relationship is one of rotational sliding engagement, the stationary gear 146 can guide and support the output gear 107.

Disposed between the input gear 143 and the cylindrical section 145 are a plurality of planet gears 147. The planet gears 147 mesh with the input gear 143 and the output gear 117 and with a second portion 149 of the stationary gear 146.

It will be appreciated by a person skilled in the art, that, through the gear mechanism described above, the speed of rotation of the rotor 113 is reduced, so that the screw 121 is rotated at a reduced speed, but with a higher torque than the rotor 113.

The arrangement of FIGS. 3 and 4 differs from that of FIGS. 1 and 2 by providing an axially and radially more compact sleeve and gear arrangement. In particular, a radially more compact arrangement is provided between the rotor 113 and the sleeve 101 by the absence of the tall profile ball bearings 23. Moreover, the axial length of the actuating arrangement is reduced by the modified sleeve and gear mechanism and the reduced length of the sleeve lowers cost. Still further, the inertia forces developed are less in the caliper 100 due to the less bulky construction of the sleeve 101, the rotor 113 and the gear mechanism.

A further important advantage provided in the disc brake caliper 100, is that the thin wall thickness of the rotor 113 in the axial section 150 and the end portion 144, permits the rotor 113 to flex when necessary to accommodate small misalignments through the gear mechanism and the ball screw that occur during operation of the caliper 100. By accommodating misalignment of that kind, the caliper 100 is less likely to jam during application or release of the disc brake and therefore the efficiency, reliability and life of the caliper 100 is improved.

It is to be noted that the arrangement of FIGS. 3 and 4, axial thrust from the ball screw 121, 122 is transmitted through the sleeve 101 to the housing 117 via the flanges 115 and 118. Thus, the caliper 100 is operable to transmit axial thrust in generally the same manner as the caliper 10 of FIGS. 1 and 2.

The invention described herein is susceptible to variations, modifications and/or additions other than those specifically described and it is to be understood that the invention includes all such variations, modifications and/or additions which fall within the spirit and scope of the above description.

The invention claimed is:

1. An actuating mechanism, comprising a screw actuator having a screw and a nut threadably coupled together, an electric drive for driving one of said screw and said nut axially relative to the other and comprising a stator and a rotor, a sleeve assembly including a generally cylindrical sleeve interposed between said rotor and said nut and supporting said rotor for rotation relative to said sleeve, said rotor being connected to one of said screw or said nut for rotating said screw or said nut, said screw actuator being at least partly mounted within said sleeve and being arranged to bear against a portion of said sleeve assembly to transmit axial thrust to said sleeve assembly, and by that transmission, to place said sleeve in tension, and said sleeve assembly cooperating with an abutment to transmit the axial thrust to said abutment, wherein said sleeve assembly comprises projections for transmission of axial thrust load, a first pair of said projections extend radially outwardly respectively for engagement with opposite sides of said abutment, while a further projection extends radially inwardly for engagement with said screw actuator.

2. An actuating mechanism according to claim 1, wherein said abutment is formed as part of a housing which houses said actuating mechanism.

3. An actuating mechanism according to claim 1, wherein said further projection supports one race of a thrust bearing of said screw actuator, to transmit axial thrust reacted by said thrust bearing to one of said pair of projections and wherein the other race of said thrust bearing is supported against one of said screw or said nut.

4. An actuating mechanism according to claim 1, wherein one of said pair of projections is a threaded ring which threadably engages said sleeve.

5. An actuating mechanism according to claim 4, wherein the other of said pair of projections, and said further projection are flanges formed integrally with said sleeve.

6. An actuating mechanism according to claim 1, wherein said sleeve comprises radially inner and outer surfaces and said rotor is supported on said outer surface.

7. An actuating mechanism, comprising a screw actuator having a screw and a nut threadably coupled together, an electric drive for driving one of said screw and said nut axially relative to the other and comprising a stator and a rotor, a sleeve assembly including a generally cylindrical sleeve interposed between said rotor and said nut and supporting said rotor for rotation relative to said sleeve, said rotor being connected to one of said screw or said nut for rotating said screw or said nut, said screw actuator being at least partly mounted within said sleeve and being arranged to bear against a portion of said sleeve assembly to transmit axial thrust to said sleeve assembly, and by that transmission, to place said sleeve in tension, and said sleeve assembly cooperating with an abutment to transmit the axial thrust to said abutment, wherein said rotor is connected to said screw or said nut by a gear mechanism, wherein said gear mechanism is a reduction gear mechanism which facilitates a reduction in the speed of rotation between said rotor and said screw or said nut, wherein said gear mechanism comprises a transmission member which extends from one axial end of said rotor, so that said transmission member rotates with said rotor, said transmission member being configured to extend about a first end of said sleeve, and to extend to within said sleeve, to form or support an input gear of said mechanism, said input gear being rotatable with said transmission member, said gear mechanism further comprises a stationary gear provided on the radially inner surface of said sleeve in a region of said first end of said sleeve, so that said stationary gear is fixed against rotation relative to said sleeve, and a plurality of planet gears are disposed between and in toothed engagement with each of said input and said stationary gears, said input gear being rotatable relative to said stationary gear, said gear mechanism further including an output gear which is in toothed engagement with said planetary gears, said output gear being rotatable relative to said stationary gear at a reduction compared to said input gear, said output gear being in fixed connection with said screw or said nut so that rotation of said output gear causes rotation of said screw or said nut.

8. An actuating mechanism according to claim 7, wherein said output gear comprises a first cylindrical portion which extends axially adjacent to said stationary gear, but which is rotatable relative to said stationary gear and to said sleeve, extending from said first cylindrical portion is a radially inwardly extending portion that extends to a second cylindrical portion that is fixed to said screw.

9. An actuating mechanism according to claim 8, wherein said second cylindrical portion is fixed to one end of said screw.

10. An actuating mechanism according to claim 7, wherein each of said input gear, said stationary gear, said planetary gears and said output gear are positioned radially within said sleeve.

11. An actuating mechanism, comprising a screw actuator having a screw and a nut threadably coupled together, an electric drive for driving one of said screw and said nut axially relative to the other and comprising a stator and a rotor, a sleeve assembly including a generally cylindrical sleeve interposed between said rotor and said nut and supporting said rotor for rotation relative to said sleeve, said rotor being connected to one of said screw or said nut for rotating said screw or said nut, said screw actuator being at least partly mounted within said sleeve and being arranged to bear against a portion of said sleeve assembly to transmit axial thrust to said sleeve assembly, and by that transmission, to place said sleeve in tension, and said sleeve assembly cooperating with an abutment to transmit the axial thrust to said abutment, wherein said rotor is connected to said screw or said nut by a gear mechanism, wherein said gear mechanism comprises an input gear, an output gear, planet gears disposed between and in meshing engagement with said input and output gears, and a stationary gear which is fixed against rotation and which is in meshing engagement with said planet gears, said rotor being arranged to drive said input gear, said input gear being arranged to drive said output gear through said planet gears, said output gear being operable to drive said screw or said nut, and wherein said rotor extends axially over said gear mechanism and radially into engagement with said input gear.

12. An actuating mechanism according to claim 11, said output gear being in connection with said screw to drive said screw to rotate and thereby to shift said nut axially.

13. An actuating mechanism according to claim 11, wherein the portion of said rotor which extends over said gear mechanism and radially into engagement with said input gear, is torsionally rigid but of limited flexibility about the axis of rotation of said gear mechanism to accommodate axial and angular misalignment between said screw and said nut.

14. An actuating mechanism according to claim 13, wherein said portion of said rotor which extends over said gear mechanism and radially into engagement with said input gear, is of a generally constant, thin wall section.

15. A disc brake caliper including a housing having a bridge section which in use, bridges a disc brake rotor, a finger section depending from a distal end of said bridge section, generally perpendicularly therefrom and arranged to support a first brake pad in facing relationship with said disc brake rotor, said housing defining a cavity within which an actuating mechanism is disposed, and which is operable to displace a second brake pad into engagement with an opposite face of said rotor, said actuating mechanism including a screw actuator having a screw and a nut threadably coupled together, an electric drive for driving one of said screw and said nut axially relative to the other and including a stator and a rotor, said stator being fixed to the housing, a sleeve assembly including a generally cylindrical sleeve interposed between said rotor and said nut and supporting said rotor for rotation relative to said sleeve, said rotor being connected to one of said screw or said nut for rotating said screw or said nut, said screw actuator being at least partly mounted within said sleeve and being arranged to bear against a portion of said sleeve assembly to transmit axial thrust to said sleeve assembly, and by that transmission, to place said sleeve in tension, and said sleeve assembly cooperating with an abutment of said housing to transmit the axial thrust to said abutment, wherein said abutment of said housing is a flange which extends radially inwardly into said cavity and a pair of projections extend from said sleeve radially outwardly to engage said housing flange on each of axially opposite sides thereof, to fix said sleeve relative to said housing, a further projection extends from said sleeve radially inwardly for engagement with said screw actuator for transmission of axial thrust to said sleeve assembly, said axial thrust being transmitted to said abutment through one of said pair of projections.

16. A disc brake caliper according to claim 15, wherein said sleeve is fixed to said housing within said cavity at a position close to the location of said second brake pad.

17. A disc brake caliper according to claim 15, wherein one of said pair of projections is a threaded ring that threadably engages said sleeve and abuts against said flange of said housing.

18. A disc brake caliper according to claim 15, wherein said pair of projections are formed integrally with said sleeve, one of said pair of projections being formed by deformation to abut a side of said flange which is opposite to said further projection.

19. A disc brake caliper according to claim 15, wherein said nut of said screw actuator is shiftable axially relative to said screw and is restrained against rotation, and said screw is drivable to rotate by said rotor.

20. A disc brake caliper according to claim 15, wherein said rotor is connected to said screw or said nut by a gear mechanism, said gear mechanism comprises a transmission member which is in engagement with one axial end of said rotor, so that said transmission member rotates with said rotor, said transmission member being configured to extend about a first end of said sleeve, and to extend to within said sleeve, to form or support an input gear of said mechanism, said input gear being rotatable with said transmission member, said gear mechanism further comprises a stationary gear provided on the radially inner surface of said sleeve in the region of said first end of said sleeve, so that said stationary gear is fixed against rotation relative to said sleeve, and a plurality of planet gears disposed between and in toothed engagement with each of said input and stationary gears, said input gear being rotatable relative to said stationary gear, said gear mechanism further comprising an output gear which is in toothed engagement with said planetary gears, said output gear being rotatable relative to said stationary gear at a reduction compared to said input gear, said output gear being in fixed connection with said screw or said nut so that rotation of said output gear causes rotation of said screw or said nut.

21. A disc brake caliper according to claim 15, wherein said rotor is connected to said screw or said nut by a gear mechanism, said gear mechanism comprises an input gear, an output gear, planet gears disposed between and in meshing engagement with said input and output gears, and a stationary gear which is fixed against rotation and which is in meshing engagement with said planet gears, said rotor being arranged to drive said input gear, said input gear being arranged to drive said output gear through said planet gears, said output gear being operable to drive said screw or said nut.

* * * * *